United States Patent [19]

Kozina et al.

[11] Patent Number: 4,794,414
[45] Date of Patent: Dec. 27, 1988

[54] UNIVERSAL CAMERA ACTUATOR BRACKET

[76] Inventors: Daniel P. Kozina, 819 Monroe Ave., South Milwaukee, Wis. 53172; Kenneth P. Pagel, 4964 S. Bartel, Greenfield, Wis. 53220

[21] Appl. No.: 116,644
[22] Filed: Nov. 4, 1987
[51] Int. Cl.⁴ ............................................. G03B 17/38
[52] U.S. Cl. ..................................... 354/269; 354/295
[58] Field of Search ................ 354/266, 269, 293, 295

[56] References Cited

U.S. PATENT DOCUMENTS

| | | | |
|---|---|---|---|
| 3,185,062 | 5/1965 | Aurandt | 354/266 |
| 4,104,623 | 8/1978 | Sloop | 354/293 |
| 4,255,036 | 3/1981 | Pincetich | 354/293 |
| 4,272,177 | 6/1981 | Ottenheimer | 354/293 |

Primary Examiner—A. A. Mathews
Attorney, Agent, or Firm—Ronald E. Barry

[57] ABSTRACT

A camera actuator bracket including an elongated base removeably mounted on the bottom of the camera and having an upright post formed at one end of the base, a locking post adjustably mounted on said upright post to accomodate different height cameras, a platform formed on the locking post to extend over the shutter button on the top of the camera, and an actuator button assembly mounted on the platform in a position to engage the shutter button on the camera.

5 Claims, 1 Drawing Sheet

UNIVERSAL CAMERA ACTUATOR BRACKET

BACKGROUND OF THE INVENTION

This invention relates to a camera bracket which can be secured to a 35 millimeter camera to provide a mount for a remote camera cable actuator.

The introduction of the new 35 millimeter camera series has created a need for a cable actuating system for operating the camera. The new cameras are not provided with threaded sockets for remote actuation by cable actuators.

SUMMARY OF THE INVENTION

The bracket, according to the present invention, has been designed to provide for easy mounting on the camera and adjustment for placing the cable release socket in a position over the electromagnetic shutter button on the camera. The bracket can be adjusted both with respect to the base of the camera as well as with respect to the height of the camera so that it can be used on both single end reflex cameras and compact cameras.

A principal features of the invention is the provision of a one piece bracket which can be readily adapted to accommadate different styles of cameras.

Another feature of the invention is the provision of a actuating button release mechanism which can be located directly over the electromagnetic shutter button on the camera.

A further feature is the provision of a vinyl spacer under the cable release socket to prevent damage to the camera.

Other principal features and advantages of the invention will become apparent to those skilled in the art upon review of the following detailed description, claims and drawings.

DETAILED DESCRIPTION OF THE DRAWINGS

Figure 2:
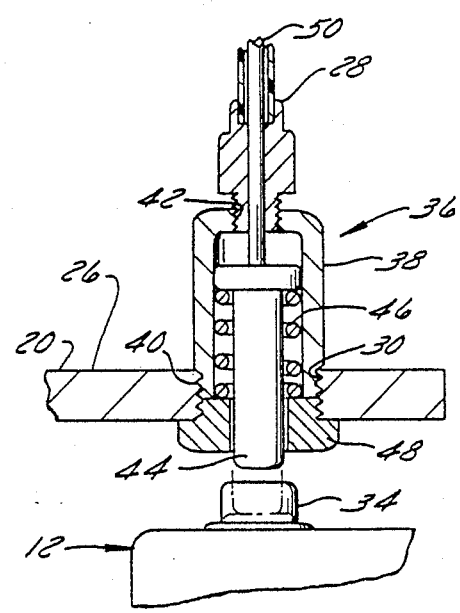
FIG. 2 is a sectional view of a button release mechanism for the bracket.

Before one embodiment is explained in detail, it is to be understood that the invention is not limited in its application to the details of construction and the arrangement of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DETAILED DESCRIPTION OF THE INVENTION

Figure 1:
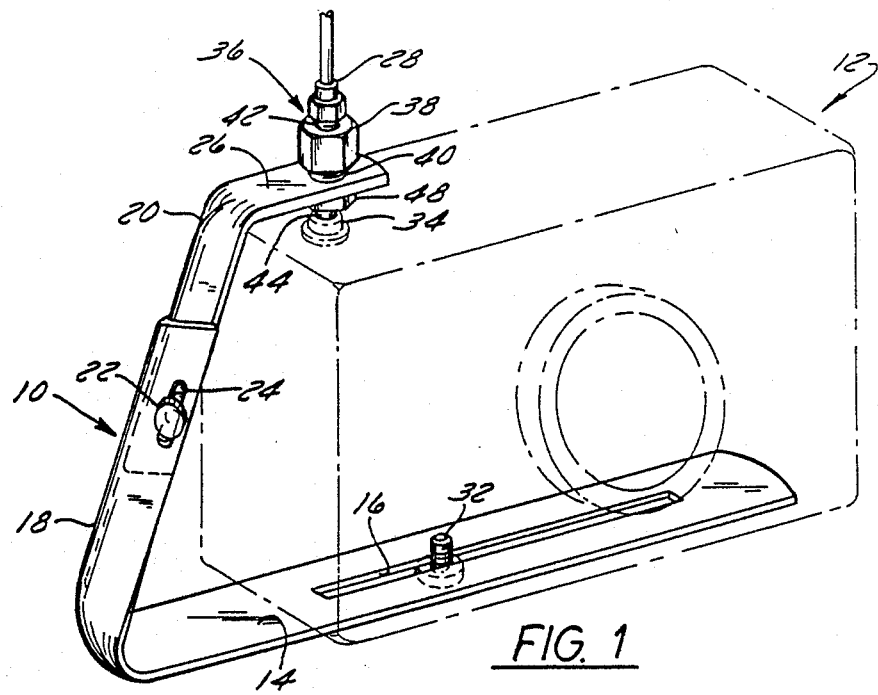
FIG. 1 is a perspective view of the bracket shown mounted on a camera.

Referring to FIG. 1 of the drawing, the bracket 10 is shown mounted on the end of a camera 12. The bracket includes a base 14 having a slot 16. One end of the base is turned upward at a right angle to form an upright post 18. Height adjustment is provided by means of a locking post 20 which is slideably received in the V-shaped upright post 18. Means are provided for locking the locked post 20 in the upright post 18. Such means is in the form of a screw 22 which is threadedly received in a slot 24 provided in the locking post 18.

A platform 26 is provided at the upper end of the lock post which is located in a parallel relationship to the base 14. The platform includes means for engaging a standard cable release 28. Such means is in the form of a threaded opening 30 provided in the platform 26.

The camera is mounted on the bracket by means of a screw 32 which is threaded into the threaded socket normally provided at the bottom of the camera 12. The screw passes through the slot 16 which allows the bracket to be moved longitudinally with respect to the camera to locate the platform over the shutter release button 34 provided at the top of the camera. The platform height is adjusted to the height of the camera and tightened into the upright post 18 by means of the screw 22. A vinyl spacer can be provided beneath the platform to prevent scratching of the camera.

The bracket may be provided with a release button assembly 36. As seen in FIG. 2 this assembly includes a housing 38 having a threaded section 40 at one end and a threaded opening 42 at the other end. The housing is mounted on the platform 26 in the threaded opening 30 and an actuator button 44 is positioned within the housing and biased therein by means of a spring 46 which is retained therein by a nylon cap 48. The release cable 28 is screwed into the threaded opening 42 with the cable 50 aligned with the button 44. With this arrangement the platform can be positively located over the electromagnetic shutter button 34 for operation of the camera.

Various other features and advantages of the invention are set further in the following claims.

We claim:

1. A camera actuator bracket for a camera having a shutter button on the top, said bracket comprising an elongated base,
   means for adjustably mounting said base on the bottom of a camera,
   an upright post at one end of said base,
   a locking post,
   means for adjustably mounting said locking post on said upright post to accommodate different height cameras,
   a cable release actuator, and
   means on said locking post for supporting said cable release actuator over the shutter button for the camera whereby said base can be adjusted to align the actuator with the shutter button on the camera.

2. The actuator bracket according to claim 1 wherein said actuator supporting means comprises a platform formed as an integral part of said locking post.

3. The actuator bracket according to claim 1 wherein said actuator includes a button assembly mounted on said supporting means.

4. The actuator bracket according to claim 2 wherein said actuator includes a button assembly mounted on said platform.

5. A camera actuator bracket comprising
   an elongated base,
   means for adjustably mounting said base on the bottom of a camera,
   an upright post at one end of said base, said upright post including
   a slot on one edge,
   a locking post,
   said locking post including
   a threaded opening, means for adjustably mounting said locking post on said upright post,
   a screw mounted in said threaded opening and aligned with said slot whereby said locking post can be set at heights within the limits of said slot to accomodate different height cameras, and
   means on said locking post for supporting a cable release actuator for a camera whereby said supporting means can be adjusted on align said actuator with a shutter button on said camera.

* * * * *